United States Patent [19]

Arcella et al.

[11] Patent Number: 5,354,824

[45] Date of Patent: Oct. 11, 1994

[54] FLUOROELASTOMERIC AND FLUOROPLASTOMERIC COPOLYMERS HAVING A HIGH RESISTANCE TO BASES

[75] Inventors: Vincenzo Arcella, Novara; Giulio Brinati, Milan; Margherita Albano, Milan; Anna Minutillo, Milan; Graziella Chiodini, Saronno, all of Italy

[73] Assignee: Ausimont S.p.A., Milan, Italy

[21] Appl. No.: 64,276

[22] Filed: May 20, 1993

[30] Foreign Application Priority Data

May 22, 1992 [IT] Italy .................... MI92 A 001244

[51] Int. Cl.$^5$ ............................................. C08F 16/24
[52] U.S. Cl. ................................. 526/247; 526/249; 526/254; 526/255
[58] Field of Search ................. 526/247, 249, 254, 255

[56] References Cited

U.S. PATENT DOCUMENTS

| | | |
|---|---|---|
| 3,655,727 | 4/1972 | Patel et al. . |
| 3,686,143 | 8/1972 | Bowman . |
| 3,712,877 | 1/1973 | Patel et al. . |
| 3,857,807 | 12/1974 | Kometani et al. . |
| 3,859,262 | 1/1975 | Hartwimmer . |
| 3,876,654 | 4/1975 | Pattison . |
| 3,933,732 | 1/1976 | Schmiegel . |
| 4,233,421 | 11/1980 | Worm . |
| 4,259,463 | 3/1981 | Moggi et al. . |
| 4,368,308 | 1/1983 | Yamabe et al. . |
| 4,694,045 | 9/1987 | Moore . |

FOREIGN PATENT DOCUMENTS

| | | |
|---|---|---|
| 120462 | 10/1984 | European Pat. Off. . |
| 182299 | 5/1986 | European Pat. Off. . |
| 250766 | 1/1988 | European Pat. Off. . |
| 250767 | 1/1988 | European Pat. Off. . |
| 280312 | 8/1988 | European Pat. Off. . |
| 315078 | 10/1989 | European Pat. Off. . |
| 407937 | 1/1991 | European Pat. Off. . |
| 0518073 | 12/1992 | European Pat. Off. . |

OTHER PUBLICATIONS

European Search Report dated Jul. 22, 1993.
Derwent Abstract and Family Search for DE 1 494 496.
Derwent Abstract and Family Search for FR 2 103 276.

*Primary Examiner*—Joseph L. Schofer
*Assistant Examiner*—N. Sarofim
*Attorney, Agent, or Firm*—Bryan Cave

[57] ABSTRACT

The invention relates to new fluoroelastomeric copolymers endowed with resistance to bases and suitable in particular for preparing O-rings, comprising:

| (I) | VDF | 47–80 mols % |
| | HFP and/or PAVE | 16–30 mols % |
| | hydrogenated olefin containing 2–4 C | 2–25 mols % |
| | or | |
| (II) | VDF | 42–80 mols % |
| | PAVE | 16–30 mols % |
| | hydrogenated olefin containing 2–4 C | 2–30 mols % |

The invention relates to new fluoroplastomeric copolymers endowed with resistance to bases, comprising:

| (III) | VDF | 70–99 mols % |
| | HFP and/or PAVE | 0–16 mols % |
| | hydrogenated olefin containing 2–4 C | 1–30 mols % |

A further object of the invention is a process for preparing the abovesaid fluoroelastomeric and fluoroplastomeric copolymers.

5 Claims, No Drawings

FLUOROELASTOMERIC AND FLUOROPLASTOMERIC COPOLYMERS HAVING A HIGH RESISTANCE TO BASES

The present invention relates to new elastomeric and plastomeric fluorinated copolymers, free from monomeric units deriving from tetrafluoroethylene, comprising monomeric units of vinylidene fluoride (VDF), of hexafluoropropene (HFP) and/or of a perfluoroalkylvinylether (PAVE), and of a hydrogenated olefin (01) containing from 2 to 4 carbon atoms, in which said olefin is present in an amount ranging respectively form 2 to 25 mols % and from 1 to 30 mols %.

A further object of the present invention is a process for preparing such copolymers.

U.S. Pat. No. 4,368,308 describes fluoroelastomeric polymers endowed with resistance to atmospheric agents and to oils as well as with stability to low temperatures.

Said copolymers contain fluorovinylether (FV) units and ethylene (E) units, in E/FV molar ratios ranging from 95/5 to 30/70, with a total content of FV+E of at least 70 mols %, wherein the possible balance to 100 can be represented by other monomeric units deriving from TFE, VDF, HFP, chlorotrifluoroethylene, etc.

The above mentioned polymers can be cured only by using peroxide intermediates, with all the drawbacks deriving from such type of vulcanization; furthermore, they exhibit very low Tg values, generally below $-25°$ C.

Lastly, as is confirmed also by U.S. Pat. No. 4,694,045, such copolymers are not obtainable with sufficiently high molecular weights, owing to the low polymerizability of the combination of ethylene with fluorovinylether.

In fact, according to U.S. Pat. No. 4,694,045, in order to obtain copolymers having a sufficiently high molecular weight it is necessary to carry out the copolymerization of ethylene and of fluorovinylether in the presence of tetrafluoroethylene.

In Italian patent application No. 2040/A 91 there are described fluoroelastomeric copolymers consisting of monomeric units of VDF, HFP and perfluoroalkylvinylethers, which are vulcanizable by using ionic systems, are endowed with high elastomeric characteristics (compression set) at law temperatures and are particularly suitable for preparing O-rings. However, such copolymers exhibit a low resistance to bases and in particular to the oils additioned with such bases.

In Italian patent application No. 2041/A 91 in the name of the Applicant hereof there are described fluoroelastomeric copolymers based on VDF, HFP, PAVE and TFE units, endowed with a good resistance to motor oils and/or to methanol-containing gasolines and with good molding characteristics, which copolymers are vulcanizable by using ionic systems and are suitable for the production of shaft seals and fuel hoses.

However, also said copolymers exhibit a low resistance to bases and to the motor oils additioned with such bases. They are particularly suitable for being used in the production of shaft seals and fuel hoses.

Lastly, Italian patent application No. 1339/A 91 describes fluoroelastomeric copolymers comprising units of VDF, HFP, TFE and of an olefin, which copolymers are endowed with a high resistance to bases, in particular to the amine-containing oils, combined with high elastomeric and processabibity characteristics.

Such copolymers are vulcanizable by using peroxides or ionic systems; in the latter case, however, they generally require vulcanization systems comprising particularly reactive accelerators.

The Applicant has now found new elastomeric fluorinated copolymers free from tetrafluoroethylene monomeric units, vulcanizable by using ionic systems, endowed with high elastomeric characteristics at low temperatures, which are particularly suitable for the production, besides of shaft seals, fuel hoses and sealing devices in general, also of O-rings.

Such copolymers, which are one of the objects of the present invention, exhibit the following molar composition of monomeric units:

| (I) | VDF | 47–80% |
| | HFP | 16–30% |
| | at least a hydrogenated olefin (01) containing 2 to 4 C and preferably 4–15%. | 2–25% |

By "hydrogenated olefin", whenever used herein, is meant an olefin comprised in the general formula:

$$CH_2=CR'R''$$

where: $R' =H$, or $CH_3$, with the proviso that, when $R'$ is $=H$, $R''$ can be H, an alkyl containing 2 to 5 carbon atoms, a perfluoroalkyl containing 2 to 5 carbon atoms, or $-CN$, $-COOH$, a phenyl, an ethereal radical, optionally perfluorinated, while when $R'$ is $=CH_3$, $R''$ is a group

Examples of such olefins are represented by ethylene, propylene, butene, acrylonitrile, styrene, acrylic acid and methacrylic acid and the corresponding methyl esters.

Preferably, the olefin is ethylene.

In the above-mentioned composition, the HFP units can be substituted in whole or in part by units of a perfluoroalkylvinylether (PAVE).

When the HFP units are fully substituted by PAVE units, equally valid have proved to be the molar compositions comprising:

| (II) | VDF | 42–80% |
| | PAVE | 16–30% |
| | at least an olefin as defined in composition (I) and preferably 4–15%. | 2–30% |

Also for composition (II), the preferred olefin is ethylene.

As already mentioned, the copolymers of the invention can be vulcanized by using ionic systems, i.e. vulcanization systems which comprise a cross-linking agent and a vulcanization accelerator.

Useful cross-linking agents are for example the ones described in U.S. Pat. Nos. 4,259,463, 3,876,654 and 4,233,421, and they can include aromatic and aliphatic polyhydroxylic compounds.

Representative of the class of the aromatic compounds are di-, tri- and tetrahydroxy-benzene, -naphthalene, -anthracene, and the bisphenolic compounds.

Preferred are the aromatic compounds which include 4,4'-thiodiphenolisopropylene-bis(4-hydroxybenzene), (i.e. Bisphenol A) and hexafluoroisopropylene-bis(4-hydroxybenzene) (i.e. Bisphenol AF), which are described in U.S. Pat. No. 4,233,241.

As accelerators it is possible to use, for example, the ones described in U.S. Pat. Nos. 3,655,727, 3,712,877, 3,857,807, 3,686,143, 3,933,732, 3,876,654, 4,233,421, 4,259,463 and in European patents 182,299 and 120,462.

Preferred compounds are those belonging to the class of the phosphonium and aminophosphonium quaternary salts described in U.S. Pat. Nos. 3,876,654 and 4,259,463.

In the case of the copolymers of composition (II), where the PAVE units fully substitute the HFP units, curing is carried out by using radical systems, for example peroxides, provided that iodine atoms and/or bromine atoms, which act as peroxide cure sites, are present in end position or along the polymeric chain.

The introduction of such atoms into the polymeric chain can be obtained by effecting the preparation of the copolymers in the presence of minor amounts (generally from 0.05 to 2% by weight calculated on the total weight of the monomers) of polymerizable brominated monomers, for example brominated olefins and/or iodidated olefins or bromine and/or iodovinylethers, or in the presence of chain transfer agents containing bromine and/or iodine, such as for example the compounds of formula $R_f(I)_x(Br)_y$ ($R_f$=perfluorinated hydrocarbon radical containing from 1 to 8 carbon atoms, x, y=numbers ranging from 0 to 2, with at least x or y=1 and $x+y\leq 2$). Iodines and/or bromines of alkaline or alkaline-earth metals can also be used to such purpose, according to what is described in European patent application 407,937.

A further object of the present invention are plastomeric fluorinated copolymers having the following molar composition of monomeric units:

| (III) VDF | 70–98% |
|---|---|
| HFP and/or PAVE | 1–16% |
| at least an olefin as is defined for composition (I) | 1–30% |

Lastly, still a further object of the present invention is a process for preparing the elastomeric and plastomeric copolymers as are defined in compositions (I), (II) and (III) mentioned hereinbefore.

Said process consists in polymerizing the monomer mixture in emulsion by means of conventional techniques, preferably in the presence of radical starters and optionally in combination with reducing agents, under the following conditions:

a) molar concentration of the olefinic monomer in the gas phase in contact with the liquid phase in the polymerization reactor, ranging from 0 to the value of the olefin equilibrium concentration, which establishes when the polymerization has started, or higher than said equilibrium value, provided that the polymerization rate is such as to produce copolymers having a molecular weight corresponding to a Mooney viscosity (1+10, 121° C.) value equal to at least 5, and preferably to at least 20;

b) presence, in the polymerization medium, of a microemulsion composed of a perfluoropolyoxyalkylene and water, at least under the polymerization conditions, in which the copolymer, which is obtained, has an olefinic monomer content higher than 5 mols %.

The microemulsions composed of perfluoropolyoxyalkylenes and water are products known in the art; they are described, for example, in European patent applications Nos. 250,766, 280,312 and 315,078.

A method for copolymerizing fluorinated monomers in the presence of such microemulsions is described for example in European patent application No. 250,767.

In practise it is operated as follows: the water and the microemulsion are introduced into the reactor and the monomer mixture, which can or not comprise the olefinic monomer, is put under pressure.

As already mentioned before, when the olefinic monomer is present in this reactor charging step, it must be in such a concentration as to satisfy the conditions indicated under the preceding point (a).

After having charged the reactor, the monomers are brought to the polymerization conditions and as soon as the reaction starts, the reactor is fed with the mixture of monomers, including the olefinic monomer, in those ratios, which are suited to obtain the copolymer of the desired composition.

The instant at which the reaction starts is evidenced by a pressure decrease in the reactor.

The values of the olefinic monomer equilibrium concentration depend, as is known, on the solubility of the monomers in the reaction medium and on their reactivity; such values can be determined by a technician skilled in the art.

Furthermore, all those who are skilled in the art are capable of determining the olefin concentration value—observing the conditions expressed under the above point (a)—which which is suited to obtain an optimum combination of reaction rate and molecular weight desired for the copolymer.

As an example, for copolymers according to the invention, containing from 5 to 10 mols % of copolymerized ethylene, it is possible to start from an initial charge in the reactor, containing ethylene in the gas phase at a concentration up to 1 mol % with respect to all the other monomers which are present, and preferably ranging from 0 to 0.5 mols %.

For copolymers having an ethylene content higher than 10 mols %, the ethylene concentration can vary from 0 to 4%, but preferably from 0 to 2 mols % referred to the other monomers; higher concentration values are not advantageous as they lead to an increase in the reaction times and to a decrease in the molecular weight of the copolymers.

The copolymerization reaction according to the process of the invention is conducted at temperatures ranging from 25° to 150° C., at pressures up to 10 MPa.

The reaction medium can contain surfactants such as, for example, ammonium perfluorooctanoate, as well as other agents which are known for being suited to the preparation of fluorinated elastomeric and plastomeric copolymers.

Along with the monomer mixture it is possible to feed, as already mentioned, minor amounts of brominated and/or iodinated monomers, and/or iodinated and/or brominated chain transfer agents, and/or alkali or alkaline-earth iodides and/or bromides.

As radicalic polymerization initiators it is possible to use, besides organic peroxides, the alkali or ammonium persulphates, perphosphates, perborates and percarbonates, optionally in combination with reducing agents such as alkaline or ammonium sulphites, bisulphites, hyposulphites, phosphites, hypophosphites, or with ferrous, cupreous, silver salts or salts of other easily oxidizable metals.

The following examples are given to illustrate the present invention.

PREPARATION OF A MICROEMULSION COMPOSED OF A PERFLUOROPOLYOXYALKYLENE AND WATER

In a glass vessel equipped with stirrer there were mixed, under mild stirring, 14.5 ml of the compound of formula:

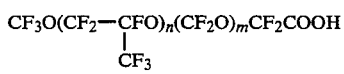

in which $n/m=10$, and having an average molecular weight=600, with 14.5 ml of $NH_4OH$ at 30% by volume. 29 ml of demineralized water were then added.

To the resulting solution there were added 8.9 ml of a product of formula:

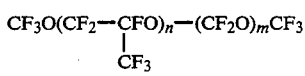

in which $n/m=20$ and having an average molecular weight equal to 450.

By heating to a temperature of 85° C., a microemulsion was obtained, which had the appearance of a limpid, thermodynamically stable solution.

EXAMPLE 1

A 10 liter reactor equipped with a stirrer running at 545 r.p.m. was utilized. After having created the vacuum, 6,500 g of water were fed and pressure was generated in the reactor by means of a monomeric mixture having the following molar composition:

| VDF | 51.5% |
|---|---|
| HFP | 48.0% |
| ET (ETHYLENE) | 0.5% |

The working temperature was of 85° C. and the pressure was of 30 relative bars.

Then, all the abovesaid microemulsion, heated to 85° C., was added, and subsequently 19.5 g of ammonium persulphate (PSA), dissolved in water, were added as a polymerization starter.

During the polymerization, the pressure was maintained constant by feeding the monomers in the following molar ratios:

| VDF | 75.0% |
|---|---|
| HFP | 20.0% |
| ET | 5.0% |

After a stretch of time of 62 minutes, 3,100 g of polymer were obtained. The reactor was cooled to room temperature, the emulsion was discharged and then coagulated by addition of an aluminium sulphate aqueous solution.

The polymer was separated, washed with water and dried in an air-circulation oven at 60° C. for 24 hours.

The data relating to the qualitative and quantitative composition of the polymer, the Tg value and the Mooney viscosity value are reported in Table 1.

The characteristics of the vulcanization composition are reported in Table 2, while the characteristics of the vulcanizate are indicated in Table 3, and the resistance characteristics of the vulcanizate to the oil containing a base (benzylamine) are reported in Table 4.

EXAMPLE 2

A reactor like the one of example 1 was utilized. Pressure was generated in the reactor by means of a monomeric mixture having the following molar composition:

| VDF | 46.5% |
|---|---|
| HFP | 53.0% |
| ET | 0.5% |

The operating temperature was of 85° C. and the pressure of 30 relative bars.

The microemulsion and the PSA were fed as in example 1.

During the polymerization, the pressure was maintained constant by feeding a monomer mixture having the following molar composition:

| VDF | 70.0% |
|---|---|
| HFP | 20.0% |
| ET | 10.0% |

After a time of 246 minutes, 3,180 g of polymer were obtained.

The data relating to the characteristics of the resulting polymer are reported in Tables 1-4.

EXAMPLE 3

It was operated as in example 1, with the exception that the pressure in the reactor was generated by means of a monomer mixture having the following molar composition:

| VDF | 40.0% |
|---|---|
| HFP | 58.0% |
| ET | 2.0% |

19.5 g of APS were fed at first; then, 9.75 g of such compound were fed after a reaction time of 1 hour, 2 hours, 3 hours and 4 hours, respectively.

During polymerization, the pressure was maintained constant by feeding a monomer mixture having the following molar composition:

| VDF | 60.0% |
|---|---|
| HFP | 20.0% |
| ET | 20.0% |

After a polymerization time of 262 minutes, 1,870 g of polymer were obtained.

The characteristics of the polymer obtained are reported in Tables 1-3.

TABLE 1

|  | Examples | | |
|---|---|---|---|
|  | 1 | 2 | 3 |
| Polymer Composition mols - % | | | |
| VDF | 75.0 | 70.0 | 60.0 |
| HFP | 20.0 | 20.0 | 20.0 |
| ET | 5.0 | 10.0 | 20.0 |
| [$\eta$] Methylethylketone (ml/g) at 30° C. | 121 | 84 | 25 |
| Mooney Viscosity ML $121°$ C. (1 + 10) | 36 | 31 | 5 |
| Tg (DSC) onset (°C.) | −24.6 | −22.0 | −19.3 |
| Tg mid point (°C.) | −21 | −18,5 | −15,2 |

TABLE 2

|  | Examples | | |
|---|---|---|---|
|  | 1 | 2 | 3 |
| Composition of the mix to be vulcanized | | | |
| Rough polymer g. | 100 | 100 | 100 |
| Bisphenol AF phr | 1.5 | 1.5 | 1.5 |
| GM 102 E (accelerator) phr | 0.65 | 0.65 | 1 |
| Ca(OH)$_2$ phr | 6 | 6 | 6 |
| MgO DE phr | 3 | 3 | 3 |
| Carbon black MT990 | 30 | 30 | 30 |
| Characteristics of the mix | | | |
| Mooney viscosity ML (1 + 10), 121° C. (Mooney degrees) | 98 | 56 | — |
| Mooney Scorch, 135° $\Delta$ t 15 (minutes) | 14'30" | 28'15" | — |
| Minimum viscosity value (Mooney degrees) | 48 | 26 | — |
| ODR 177° C., 3° Arc (ASTM D2084-81) | | | |
| ML (pound.foot.inch.) | 22 | 9 | 1 |
| MH (pound.foot.inch.) | 120 | 98 | 50 |
| ts$_2$ seconds | 90 | 156 | 66 |
| ts$_{10}$ seconds | 111 | 89 | 90 |
| ts$_{50}$ seconds | 135 | 222 | — |
| t$_{90}$ seconds | 243 | 318 | 486 |
| V max (pounds.foot.inch./sec) | 2,25 | 1,67 | 0,4 |
| Vulcanizate properties after vulcanization under pressure at 170° C. for 10 minutes | | | |
| 100% modulus MPa | 4.3 | 3.8 | — |
| Tensile strength MPa | 11.6 | 9.9 | 4.8 |
| Elongation at break % | 274 | 264 | 96 |
| Shore hardness A points | 70 | 69 | 67 |
| Vulcanizate properties after post-vulcanization in oven at 230° C. for 8 + 16 hours | | | |
| 100% modulus MPa | 7 | 6.2 | — |
| Tensile strength MPa | 17.2 | 15.4 | — |
| Elongation at break % | 201 | 189 | — |
| Shore hardness A points | 72 | 72 | — |
| Compression set (70 h at 200° C.) (ASTM D 1414-78) | | | |
| O-ring 214 (method ASTM B) % | 22 | 27 | — |
| Disc (12.5 × 29 mm) % | 21 | 22 | — |
| Test TR | | | |
| Tr 10% | −15.5 | −12.0 | — |
| Tr 30% | −11.7 | −8.3 | — |
| Tr 50% | −9.6 | −6.0 | — |

CHEMICAL RESISTANCE TO OILS

The tests to determine the chemical resistance to oils were carried out using ASTM 3 Oil containing 1% by volume of dissolved benzylamine, keeping the tests pieces type DIN S2 of a polymer standard sample (vulcanized in a press at 170° C. for 10 minutes and post-treated in oven at 230° C. for 8+16 hours) immersed in the oil at 160° C. for 3 days, using a sample/oil volume ratio equal to 1/10.

The characteristics of the polymer after such treatment are reported in Table 4.

RESISTANCE TO METHANOL

TABLE 4

| Resistance to oil ASTM3 additioned with 1% of benzylamine (results obtained after 3 days at 160° C.) | Examples | |
|---|---|---|
|  | 1 | 2 |
| 100% modulus MPa | 6.8 | 6.6 |
| Tensile strength MPa | 11.5 | 11 |
| Elongation at break % | 160 | 165 |
| Volume $\Delta$V% | +6 | +5 |
| Shore hardness A points | +73 | −71 |
| Cracks | none | none |

We claim:

1. Fluoroelastomeric copolymers, having resistance to bases, comprising the following monomers:
   (a) 47–80 mole % vinylidene fluoride;
   (b) 16–30 mole % hexafluoropropene and/or perfluoroalkylvinylether; and
   (c) 2–25 mole % of a compound said compound having the formula $$CH_2=CR'R''$$

wherein R' =H or CH$_3$, with the proviso that when R' is H, R" is selected from the group consisting of H, an alkyl containing 1 to 5 carbon atoms, a perfluoroalkyl containing 1 to 5 carbon atoms, —CN, —COOH, phenyl, and an ethereal radical, optionally perfluorinated, while when R' is

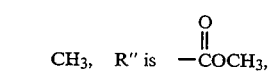

the fluoroelastomeric copolymer being free from monomeric units derived from tetrafluoroethylene.

2. The fluoroelastomeric copolymers of claim 1, wherein the compound is present in amounts from 4 to 15 mole %.

3. Fluoroelastomeric copolymers, having resistance to bases, comprising the following monomers:
   (a) 42–80 mole % vinylidene fluoride;
   (b) 16–30 mole % perfluoroalkylvinylether; and
   (c) 2–30 mole % of a compound said compound having the formula $$CH_2=CR'R''$$

wherein R' =H or CH$_3$, with the proviso that when R' is H, R" is selected from the group consisting of H, an alkyl containing 1 to 5 carbon atoms, a perfluoroalkyl containing 1 to 5 carbon atoms, —CN, —COOH, phenyl, and an ethereal radical, optionally perfluorinated, while when R' is $$CH_3, \quad R'' \text{ is } -\overset{\overset{O}{\|}}{C}OCH_3,$$

the fluoroelastomeric copolymer being free from monomeric units derived from tetrafluoroethylene.

4. The fluoroelastomeric copolymers of claim 3, wherein the compound is present in amounts from 4–15 mole %.

5. Fluoroelastomeric copolymers, having resistance to bases, comprising the following monomers:
(a) 70–99 mole % vinylidene fluoride;
(b) 0–16 mole % hexafluoropropene and/or perfluoroalkylvinylether; and
(c) 1–30 mole % of a compound said compound having the formula $$CH_2=CR'R''$$

wherein R' =H or $CH_3$, with the proviso that when R' is H, R" is selected from the group consisting of H, an alkyl containing 1 to 5 carbon atoms, a perfluoroalkyl containing 1 to 5 carbon atoms, —CN, —COOH, phenyl, and an ethereal radical, optionally perfluorinated, while when R' is $CH_3$, R" is $-\overset{\overset{O}{\|}}{C}OCH_3$, the fluoroplastomeric copolymer being free from monomeric units derived from tetrafluoroethylene.

* * * * *